United States Patent [19]

Tanaka et al.

[11] Patent Number: 5,561,529

[45] Date of Patent: Oct. 1, 1996

[54] IMAGE SIGNAL REPRODUCING APPARATUS

[75] Inventors: Yasuyuki Tanaka, Tokyo; Tetsuya Shimizu, Yokohama; Katsumi Karasawa, Kawasaki, all of Japan

[73] Assignee: Canon Kabushiki Kaisha, Tokyo, Japan

[21] Appl. No.: 163,005

[22] Filed: Dec. 8, 1993

[30] Foreign Application Priority Data

Dec. 22, 1992 [JP] Japan ................................. 4-342185
Dec. 22, 1992 [JP] Japan ................................. 4-342186
Jan. 28, 1993 [JP] Japan ................................. 5-012153

[51] Int. Cl.$^6$ ............................................... H04N 5/926
[52] U.S. Cl. ........................... 386/77; 348/416; 386/81; 386/111
[58] Field of Search ................................. 358/335, 336, 358/312, 314; 348/416; 360/10.1; H04N 5/926

[56] References Cited

U.S. PATENT DOCUMENTS

| | | | |
|---|---|---|---|
| 4,280,147 | 7/1981 | Baldwin | 360/10.1 |
| 4,558,377 | 12/1985 | Collins | 358/312 |
| 4,635,134 | 1/1987 | Sassamura et al. | 358/312 |
| 4,800,447 | 1/1989 | Toba | 360/10.3 |
| 4,864,430 | 9/1989 | Yoshimura et al. | 360/9.1 |
| 4,873,587 | 10/1989 | Yoshimura et al. | 360/10.2 |
| 5,003,406 | 3/1991 | Hatanaka et al. | 360/10.2 |
| 5,227,878 | 7/1993 | Puri | 348/416 |
| 5,400,076 | 3/1995 | Iwamura | 348/416 |

FOREIGN PATENT DOCUMENTS 0468646 1/1992 European Pat. Off. .
8200558 2/1982 WIPO .

*Primary Examiner*—Howard W. Britton
*Attorney, Agent, or Firm*—Fitzpatrick, Cella, Harper & Scinto

[57] ABSTRACT

The present invention provides an image signal reproducing apparatus, in which a writing operation memory structure temporarily storing the image signal is controlled such that control structure prohibits sad memory structure from writing the same portion of the image signal that said memory structure has stored, to prove the image signal reproducing apparatus which is adequate to reproduce image data compressed by the inter-frame encoding, an image signal reproducing apparatus, in which a reading operation of memory structure temporarily storing the image signal is controlled such that control structure changes a unit portion of an image signal repeatedly read out from said memory structure according to a motion of the image signal, to maintain the vertical resolving power for still images and to prevent the motion images to become unnatural, and an image signal reproducing apparatus, in which a writing operation of memory structure temporarily storing the image signal is controlled such that control structure changes a condition to allow the image signal to be written in said memory structure, to reproduce the image signal having as high quality as possible.

27 Claims, 12 Drawing Sheets

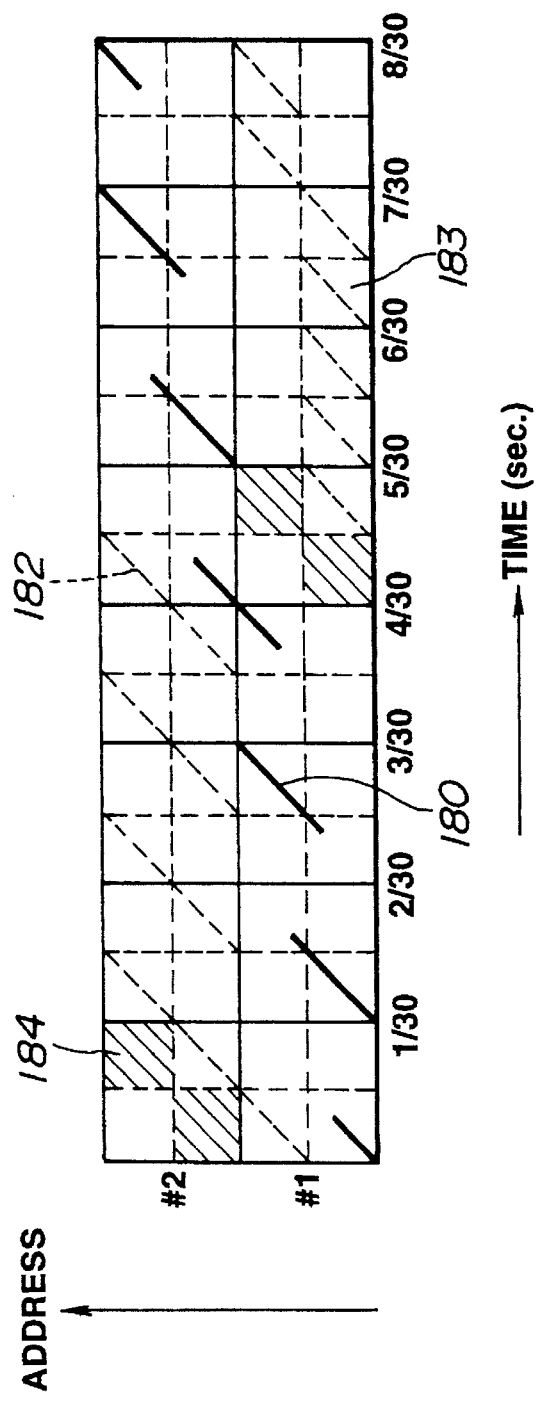
FIG.11(A)
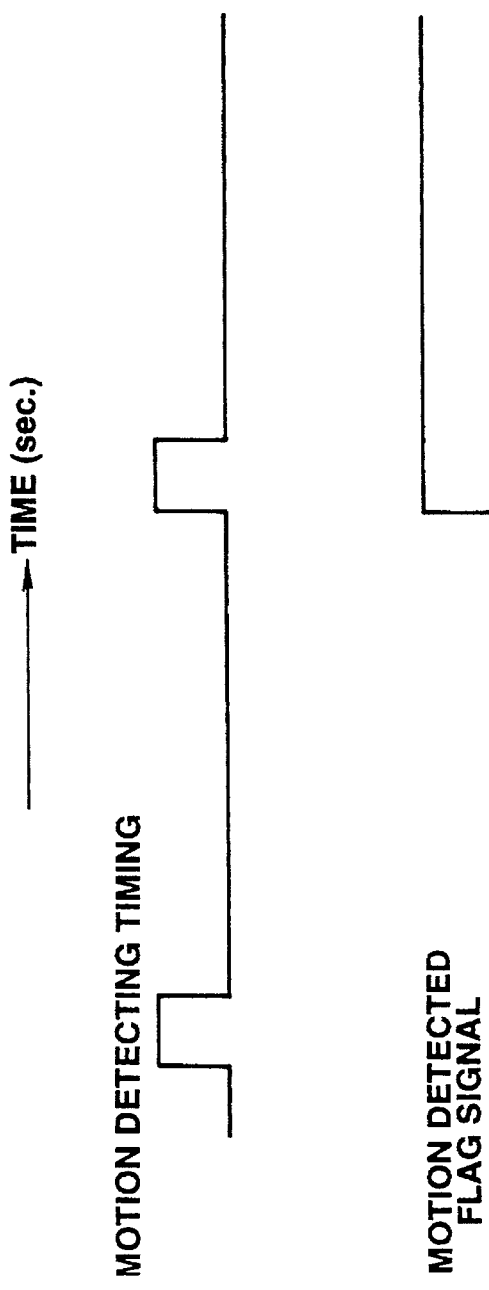
FIG.11(B)
FIG.11(C)

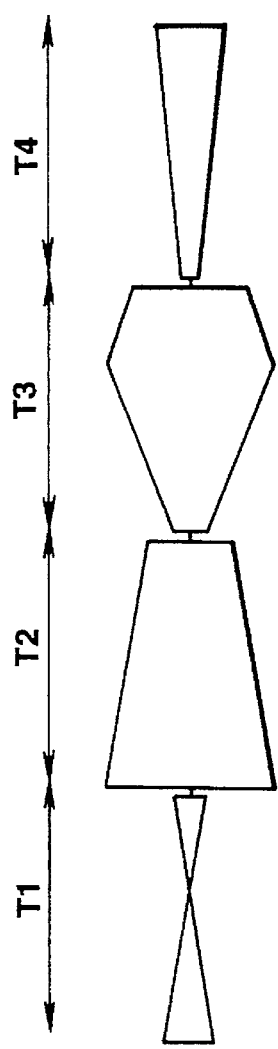
FIG.14(A) REPRODUCED SIGNAL
FIG.14(B) ENVELOPE DETECT SIGNAL (Venv)
FIG.14(C) DOS

IMAGE SIGNAL REPRODUCING APPARATUS

FIELD OF THE INVENTION

This invention relates to an image signal reproducing apparatus and, in detail, to an apparatus which can reproduce the image signal with changing a sequence thereof to give the image special effects.

DESCRIPTION OF THE PRIOR ART

As an example of an information recording system, a digital video tape recorder (DVTR) is known. The DVTR generally forms a synchronizing block composed of a predetermined number of video codes, shown in FIG. 1 as DATA, synchronizing codes, shown in FIG. 1 as SYNC, subordinate information codes including address codes, shown in FIG. 1 as ID, and redundant codes including error corrective parity codes for detecting and correcting transmission errors, shown in FIG. 1 as PARITY.

The DVTR forms a sequence of the synchronizing blocks and records the sequence on a recording medium. FIG. 2 shows One example of a recording mechanism which has two rotary heads 1A,1B fixed on a rotary drum 2. A magnetic tape T is wound around a peripheral surface of the drum 2 over an angular range of 180°. The recording heads 1A,1B alternately record the sequence of the blocks on the magnetic tape T.

FIG. 3 shows an example of a recorded format formed on the magnetic tape T. In FIG. 3, it is assumed that the sequence corresponding to one field of the video signal is recorded on one track formed on the tape T, and each of A1,A2, . . . , An,B1,B2, . . . , Bn shows the synchronizing block. Further, it is also assumed that the length of one field is a sixtieth of a second and one frame, the length of which is a thirtieth of a second, is composed of two fields. An n number of the block are recorded on one track. The blocks A1,A2, . . . An are recorded by the rotary head 1A, and the blocks B1,B2, . . . Bn are recorded by the rotary head 1B. The rotary heads 1A,1B have different azimuth angles from each other. Accordingly, the blocks A1,A2, . . . An and the blocks B1,B2, . . . , Bn are recorded on the adjacent tracks with different azimuth angles. The azimuth angles of the head 1A,1B are considered as respective positive (+) and negative (−) azimuth angles.

FIG. 4 shows tracing loci of the rotary head relative to the track every thirtieth second in a slow motion reproducing mode, when the tape is transported at a fourth of the speed at which the tape is transported in a recording mode. In FIG. 4, solid lines show a recorded track, dotted lines show tracing loci of the rotary head having an azimuth angle corresponding to the shown recorded track in a slow motion reproducing mode, and hatched areas show areas where a recorded Signal can be picked up. Generally speaking, the digital recorded signal can be reproduced when the signal is picked up from a half or more of the width of the track.

Such conventional a DVTR as described operates in the slow motion reproducing mode by writing reproduced data into a memory every time a reproducing head traces over the same track, unless the address codes included in the subordinate information codes ID are not reproduced. In short, repeated writings are carried out. The slower the reproducing speed, the more times the writing is repeated.

Therefore, it is apparent from FIG. 4 that, after the reproduced data, likely to have the least errors and obtained from the reproduced signal having the largest envelope amplitude, has been written in the memory, the written data is undesirably over-written by reproduced data obtained from a reproduced signal having a relative small envelope amplitude. Because it is generally known that reproduction data obtained from a signal having a smaller envelope amplitude have more errors, data having a low error rate are undesirably over-written by data having a high error rate. Accordingly, such over-writing causes a higher rate of uncorrectable errors which even the error correcting process may not be able to correct.

Additionally, a DVTR has repeatedly to reproduce the same frame or the same field of the video signal in the slow motion reproducing mode. When the DVTR outputs the reproduced signal involving rapid motion by a frame as a unit, two different fields of images in the same frame are alternately output a plurality of times. As a result, the motion in the displayed images becomes unnatural because the part of the image involving the motion vibrates. Therefore some conventional DVTRs output the reproduced signal by a field as a unit in the slow motion reproducing mode.

However, such a conventional DVTR makes the vertical resolving power decline by half so that clarity in the still part of the image is considerably reduced.

On the other hand, a recording method comprising a step for encoding images, especially motion images, to compress an amount of data thereof by using a DCT (Discrete Cusine Transformation) or the like and a step for recording a compressed digital code on a recording medium, e.g. a magnetic tape, is known as a suitable method for the DVTR. Further, a compressing method which adaptively combines an intra-frame encoding and an inter-frame encoding is known as the encoding step described above. The inter-frame encoding achieves a compression with a remarkable high compressive rate for a still image and an image having a little motion. Therefore, the adaptive compressing method adopts the inter-frame encoding for the still image and the image involving a little motion and adopts the intra-frame encoding for an image involving a rapid motion or an image having a large difference between adjacent two frames. When the inter-frame encoding has been continually carried out for a long time, the quality of the reproduced image gradually deteriorates. Because if the uncorrectable error occurs in a transmitting path, the uncorrectable error spreads over following frames. Intra-frame encoding is also adopted to prevent such spread of errors.

However, when the same frame of the video signal is repeatedly reproduced a plurality of times, it is impossible for the image data compressed by the inter-frame encoding to be appropriately reproduced by the DVTR which adaptively adopts the inter-frame encoding and the intra-frame encoding. Therefore, such DVTR mentioned above must limit a reproducing speed.

SUMMARY OF THE INVENTION

One of the objects with which the invention is concerned is to provide an image signal reproducing apparatus which can overcome problems occurred when the same portion of the image signal is repeatedly reproduced.

A further object with which the invention is concerned is to provide an image signal reproducing apparatus which is adequate to reproduce image data compressed by the inter-frame encoding.

A writing operation of memory means which temporarily stores the reproduced image signal is controlled, according to one aspect of the invention, by control means such that said control means prohibits the over-writing of a portion of the image signal that said memory means has already stored.

A further object with which the invention is concerned is to provide an image signal reproducing apparatus which can maintain the vertical resolving power for still images and prevent the motion images to become unnatural even when the same portion of the image signal is repeatedly reproduced.

A reading operation of memory means which temporarily stores the reproduced image signal is controlled, according to another aspect of the invention, by control means such that said control means changes a unit portion of an image signal repeatedly read out from said memory means according to a motion of the image signal.

A further object with which the invention is concerned is to provide an image signal reproducing apparatus which reproduces the image signal by using image signal having as high quality as possible.

A writing operation of memory means which temporarily stores the reproduced image signal is controlled, according to a further aspect of the invention, by control means such that said control means changes a condition to allow the image signal to be written in said memory means.

Other objects of the invention and other aspects of the invention will be apparent from the following description and drawings.

BRIEF DESCRIPTION OF THE DRAWINGS

FIG. 11(a)–1(c) is a model chart which shows accessing addresses to the memory and signals in FIG. 10.

FIG. 14(A)–(C) is a timing chart which shows relations among signals in the circuit shown in FIG. 13.

DETAILED DESCRIPTION OF THE PREFERRED EMBODIMENTS

Embodiments of the present invention will now be described, by way of example only, with reference to the accompanying drawings.

Figure 5:
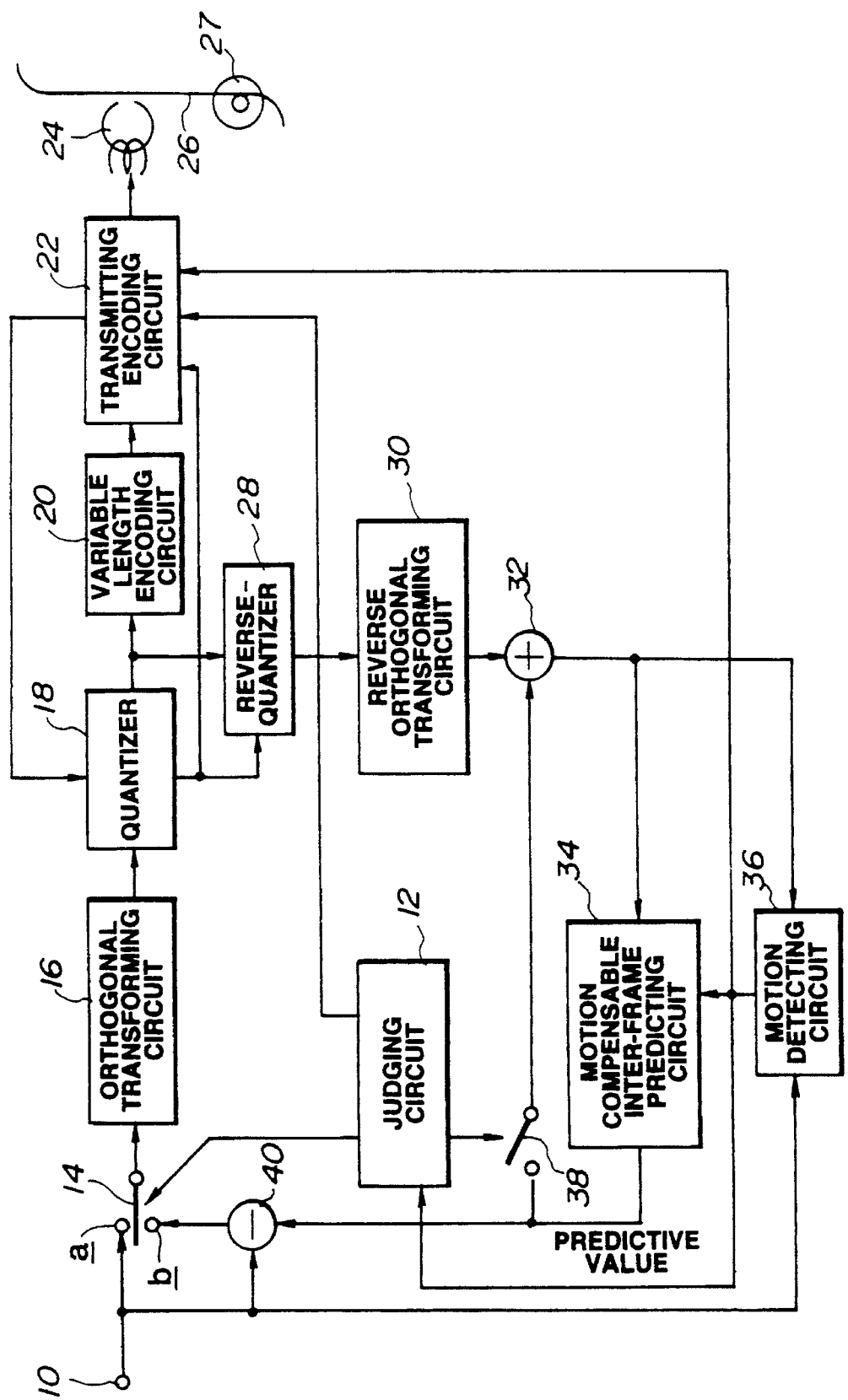
FIG. 5 is a block diagram which shows a recording system of the DVTR being capable of being applied to the present invention.

FIG. 5 is a block diagram showing a recording system of the DVTR which is capable of being applied to the present invention. In FIG. 5, an image signal input to an input terminal 10 has been sampled and digitized, and is input by an image block composed of a plurality of pixels as a unit. A judging circuit 12 judges which encoding method needs to be selected, namely inter-frame encoding or intra-frame encoding, according to a motion vector detecting by a motion detecting circuit. The judging circuit 12 outputs a switching control signal to switch a switching circuit 14 such that the switching circuit 14 is connected to a terminal to select the blocked image signal input to the input terminal 10 when the intra-frame encoding is selected and is connected to a terminal b to select a blocked differential signal (a predictive error) output from a subtracter 40.

The judging circuit 12 is designed periodically to select the intra-frame encoding to prevent the spread of uncorrectable errors as described above.

An output signal of the switching circuit 14 is supplied to an orthogonal transforming circuit 16. The circuit 16 executes an orthogonal transformation, for example the DCT, and outputs transformed coefficients. The coefficients are formed by removing the spatial correlation from the image signal, and energy concentrates on a part of the coefficients. A quantizer 18 minutely quantizes the coefficients on which energy concentrates rather than other coefficients. A variable length encoding circuit 20 assigns encoded codes to quantized outputs such as an average code length becomes short.

The data encoded by the variable length encoding circuit 20 is supplied to a transmitting encoding signal 22 as main information. Further, discriminating information which indicates the encoding method, i.e. intra-frame encoding or inter-frame encoding, output from the judging circuit 12, motion information output from the motion detecting circuit 36, information of number of frames and blocks and information of the quantizing step output from the quantizer 18 is supplied to the circuit 22. The circuit 22 forms the subordinate information codes (ID) by using such information and composes a recording signal from the main information codes, the subordinate information codes, parity codes for error correcting, and synchronizing codes for forming the synchronizing block, and supplies the recording signal to two magnetic heads 24 which are similar to the heads 1A,1B shown in FIG. 2.

A magnetic tape 26 is transported by a capstan 27 at a predetermined speed, and the recording signal is recorded by the rotary magnetic heads 24 according to the well-known helical scanning system.

A reverse-quantizer 28 reverse-quantizes the quantized outputs output from the quantizer 18 according to the information of the quantizing step also output from the quantizer 18. In short, the reverse-quantizer 28 outputs decoded transformed coefficients. A reverse orthogonal transforming circuit 30 reverse orthogonal transforms the transformed coefficients output from the reverse-quantizer 28 and supplies outputs thereof to an adder 32.

The judging circuit 12 opens a switch 38 when the intra-frame encoding is selected and closes the switch 38 when the inter-frame encoding is selected. Accordingly, the adder 32 directly outputs the outputs of the reverse orthogonal transforming circuit 30 when the intra-frame encoding is selected, and outputs the sum of the outputs of the reverse orthogonal transforming circuit 30 and a predictive signal when the inter-frame encoding is selected. Thus a local decoded signal for both the intra-frame encoding and the inter-frame encoding is obtained from the adder 32.

The output of the adder 32 is supplied to a motion compensatable inter-frame predicting circuit 34 and the motion detecting circuit 36. The motion detecting circuit 36 detects a motion vector by using the local decoded signal output from the adder 32 and the present image signal input to the terminal 10, and supplies the results of motion detecting to the judging circuit 12 and the motion compensatable inter-frame predicting circuit 34.

The circuit 34 compensates the local decoded signal for motion of the image by referring to the motion vector detected by the motion detecting circuit 36 and computes the predictive signal for a following frame. The computed predictive signal is supplied to the subtracter 40 and is supplied to the adder 32 via the switch 38.

By means of the circuits described, the image signal can be adaptively encoded by either the intra-frame or inter-frame encoding method, or can be periodically encoded by either of them, and the encoded image signal recorded on the magnetic tape 26.

Further, the transmitting encoding circuit 22 always watches the amount of the data to be output and controls the extent of the quantizing step in the quantizer in order to maintain the predetermined amount.

Figure 6:
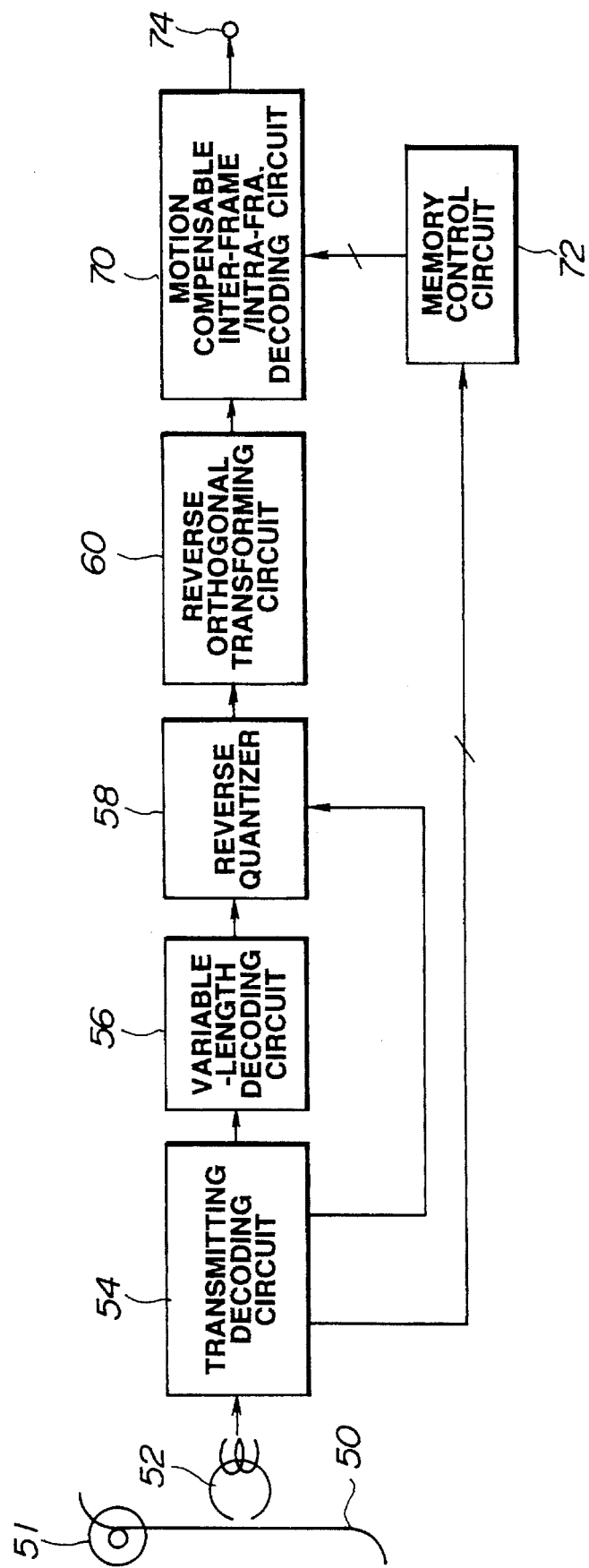
FIG. 6 is a block diagram which roughly shows a reproducing system of the DVTR according to an embodiment of the present invention.

FIG. 6 is a block diagram which schematically shows a reproducing system according to the present invention and corresponding to the recording system shown in FIG. 5. In FIG. 6, it is assumed that the recording signal formed by the recording system shown in FIG. 5 has been recorded on a magnetic tape 50 and the recording signal is composed of motion image information and the other information.

Figure 2:
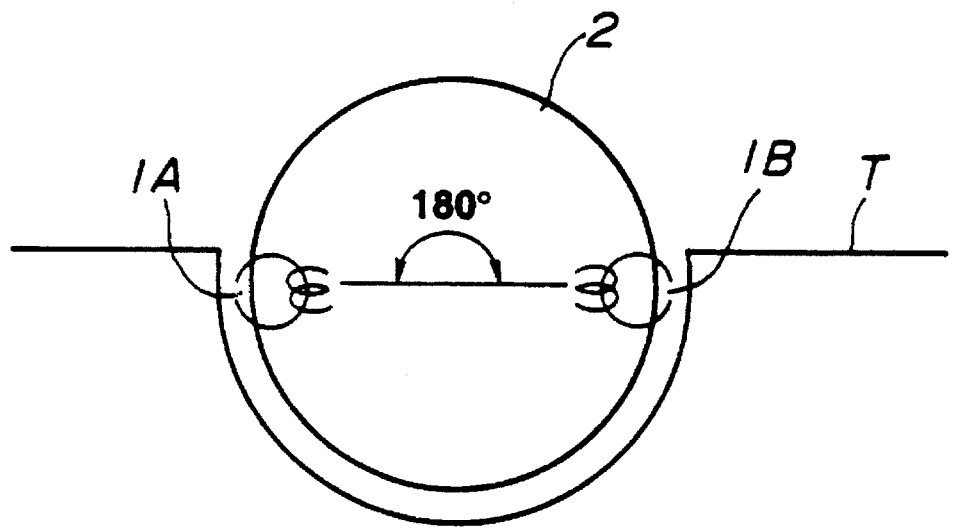
FIG. 2 shows an example of a recording mechanism of the DVTR.

The recorded signal is reproduced by rotary magnetic heads 52 which are the heads 1A,1B shown in FIG. 2 while a capstan 50 transports the magnetic tape 50. The signal reproduced by the heads 52 is supplied to a transmitting decoding circuit 54. The circuit 54 separates and extracts each kind of information from the reproduced signal on the basis of the synchronizing codes, and corrects code errors occurred in the transmitting path on the basis of the parity codes composing the error correction code.

The variable length encoded data, i.e. main data, are supplied from the transmitting decoding circuit 54 to a variable length decoding circuit 56 and are decoded therein. The decoded data are supplied to a reverse quantizer 58 and are reverse-quantized thereby according to information of the quantizing step detected in the transmitting decoding circuit 54.

The output data of the reverse-quantizer are orthogonal transformed coefficients and are supplied to a reverse orthogonal transforming circuit 60. The circuit 60 reverse orthogonal transforms the coefficients into the image data. The output data of the circuit 60 is the decoded image data when the image data is encoded by the intra-frame encoding, and is the predictive data when the image data is encoded by the inter-frame encoding.

The output data of the reverse orthogonal transforming circuit 60 is supplied to a motion compensatable inter-frame/intra-frame decoding circuit 70. The circuit 70 has to include a memory being capable of storing two frames of the image signal. The region for storing the present frame of the image data and the region for storing the previous frame of the image data are alternately changed in the memory. A detailed circuit in the circuit 70 is described hereinafter. The decoded image data formed in the decoding circuit 70 is externally output from an output terminal 74.

Figure 7:
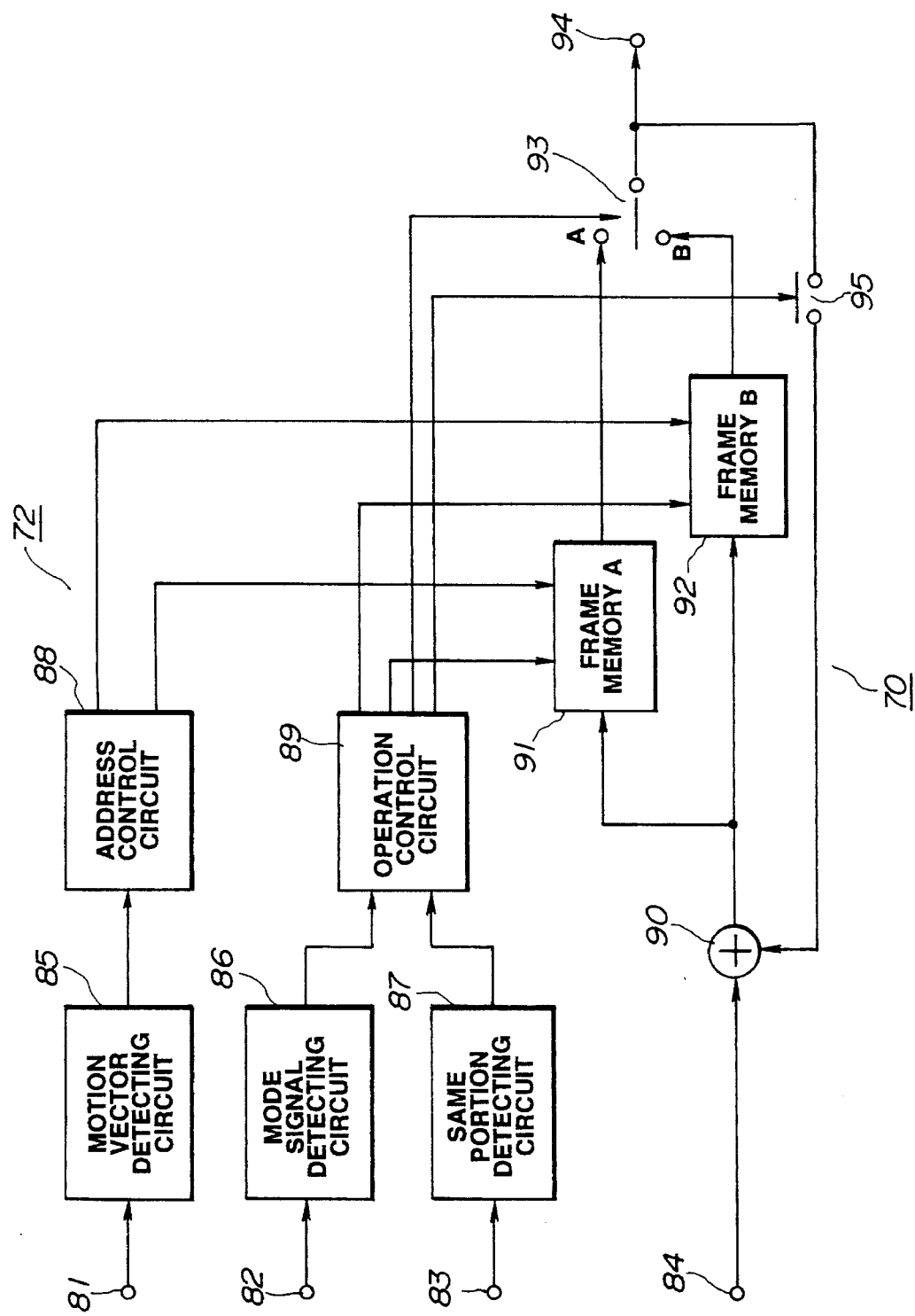
FIG. 7 is a block diagram which shows an example of a detailed circuit of a primary circuit in the reproducing system shown in FIG. 6.

FIG. 7 is a block diagram of a concrete example of the decoding circuit 70 and the memory control circuit 72 both shown in FIG. 6. In FIG. 7, input terminals 81,82 and 83 receives the subordinate information codes separated by the transmitting decoding circuit 54. A motion vector detecting circuit 85 detects the motion information including the motion vector from the subordinate information codes. A mode signal detecting circuit 86 detects mode (discriminating) information described above from the subordinate information codes.

In a normal reproducing mode, an operation control circuit 89 makes frame memories A,B (91,92) alternately enabled to be written the image data for one frame period, and makes a switch 93 alternately connect to terminals A,B for the one frame period. For example, when the image signal of the present frame is written in the frame memory A (91) in a certain frame period, the image signal of the previous frame is read out from the frame memory B (92) and is output to an output terminal via the terminal B of the switch 93. In a following frame period, the image signal is written in the frame memory B (92) as an image signal of the present frame, the image signal stored in the frame memory A (91) is read out as an image signal of the previous frame.

Reading addresses of the frame memories A,B are controlled by an address control circuit 88 according to the motion vector output from the motion vector detecting circuit to compensate for the motion of the image.

The operation control circuit 89 also controls a switch 95 such that the switch 95 is opened when the image signal encoded by the intra-frame encoding is input to an input terminal 84 and the switch 95 is closed when the image signal encoded by the inter-frame encoding is input to an input terminal 84. Accordingly, an adder 90 directly outputs the image signal input to the terminal 84 to decode the intra-frame encoded image signal and outputs the sum of the output signal of the switch 93 and the image signal input to the terminal 84 to decode the inter-frame encoded image signal.

Figure 8:
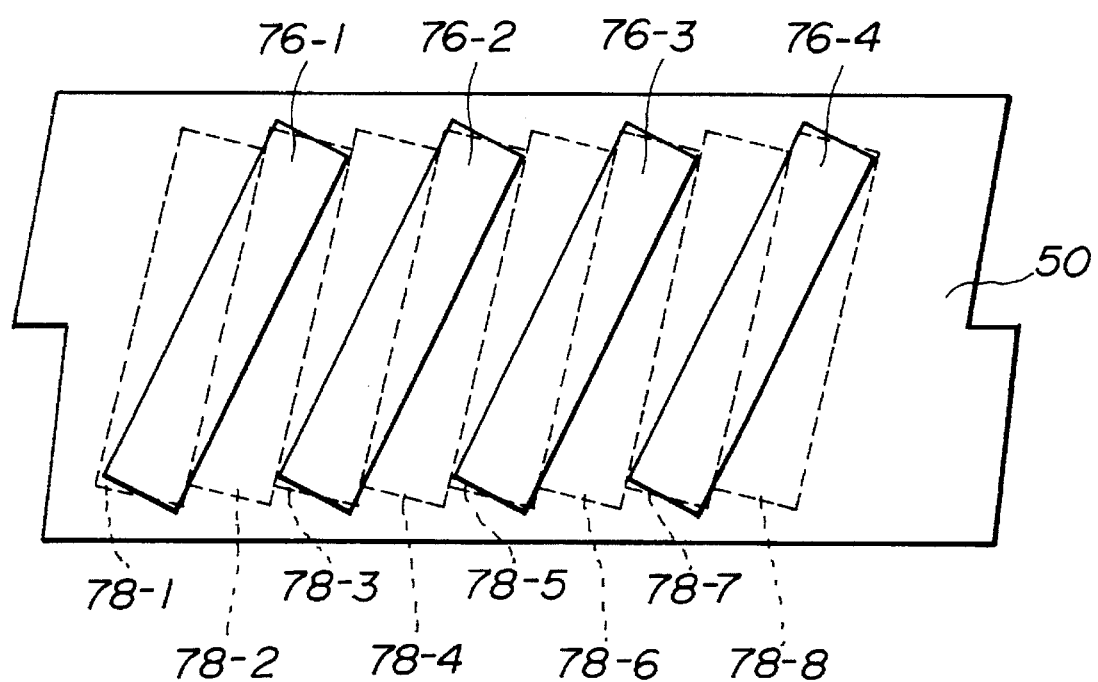
FIG. 8 shows a model of tracing loci of the rotary head relative to the track formed by the DVTR shown in FIG. 6.

The operations for producing a slow motion image are described as follows. In this specification, it is assumed that the capstan 51 transports the magnetic tape 50 at a half speed of the predetermined speed at which the tape is transported in the recording mode. It is also assumed that the image signal of one frame is recorded on two adjacent tracks having different azimuth angles, one of the adjacent tracks is traced twice as shown in FIG. 8, and the other (not shown in FIG. 8) is traced in the same way, for the sake of easy understanding. In short, each of recording tracks 76-1, 76-2, 76-3, 76-4 on which the image signal of odd field is recorded is reproduced by the rotary head tracing on loci 78-1, 78-2, 78-3, 78-4, 78-5, 78-6, 78-7, 78-8.

Finally, it is assumed that the recorded image signals of the frames #1, #4 are encoded by the intra-frame encoding and the recorded image signals of the frames #2, #3, #5 are encoded by the inter-frame encoding in the consecutive five frames #1, #2, #3, #4, #5.

A same portion detecting circuit 87 separates the information of frame and block number from the subordinate information codes, and detects whether or not frame and block numbers of the image signal input to the terminal are same as that of the image signal which has already been input. If the image signal of the same block in the same frame has been already input, the same portion detecting circuit 87 outputs a detection signal to the operation control circuit 89 and the operation control circuit 89 prevents the image signal of the same block in the same frame from being written into the frame memories A,B (91,92). Accordingly, even if the image signal of the same frame is repeatedly reproduced, the frame memory A (91) or the frame memory B preserves the image signal of the previous frame. The image signal of the same frame repeatedly reproduced can be correctly decoded, even if it is encoded by the inter-frame encoding method.

Figure 9:
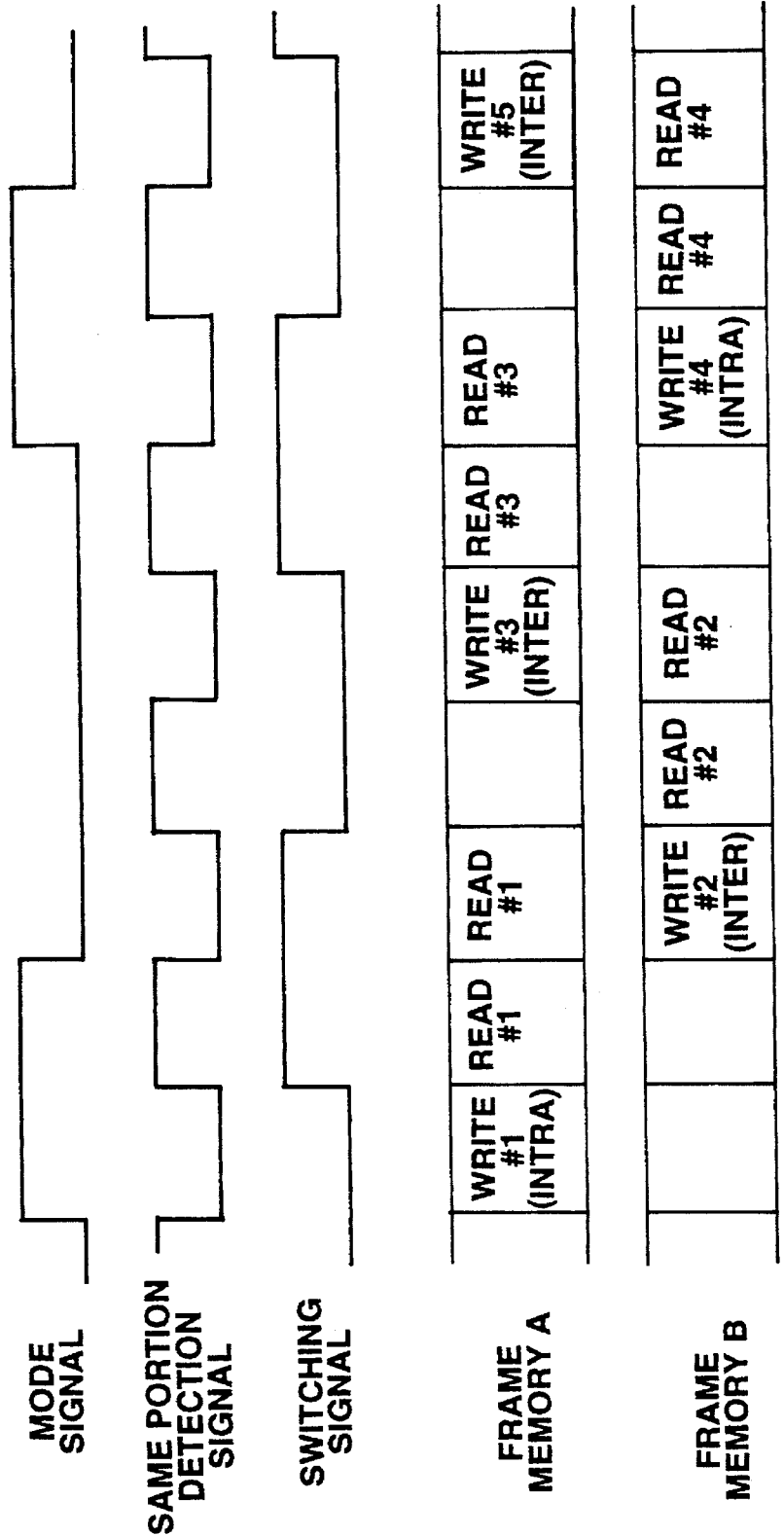
FIG. 9 is a timing chart which shows relations among signals in the circuit shown in FIG. 7.

According to the assumptions described above, FIG. 9 shows the relations among the mode signal, the detection signal, a switching signal for enabling the frame memory A (91) or B (92) to write or read out the image signal, and the operating conditions of the frame memories A (91) and B (92).

The image signal of the frame #1 input in a period t1 is intra-frame encoded, as indicated by a high level of the mode signal. The operation control circuit 89 enables the frame memory A (91) to write the image signal of the frame #1 according t the switching signal produced thereby, and opens the switch 95. Therefore the image signal from the reverse orthogonal transforming circuit 60 is directly written in the frame memory A (91). The image signal input in a period t2 is the same signal that has been input in the period t1. Therefore, the operation control circuit 89 prohibits the memories A and B (91 and 92) from writing according to a high level of the same portion detection signal. In the period t2, the image signal of the frame #1 is read out from the frame memory A (91), because the switching signal has been turned into a low level. The switching signal is turned when the image signal of the complete frame has been written.

In the period t3, the image signal input to the terminal 84 is inter-frame encoded and is concerned with different frame from the image signal input in the period t2. Therefore, the image signal input in the period t3 is added to the image signal read out from the frame memory A (91) by the adder 90. The decoded image signal of the frame #2 is output from the adder 90, and is written into the frame memory B (92). In the period t3, the image signal of the frame #1 is read out from the frame memory A (91).for the second time and is externally output from the terminal 94.

The image signal input in the period t4 is the same signal that has been input in the period t3. Therefore, the operation control circuit 89 prohibits the memories from writing, and the image signal of the frame #2 is read out from the frame memory B (92).

The image signal input in the period t5 is different from the signal which has been input in the period t4, and is inter-frame encoded. Therefore, the image signal input in the period t5 is added to the image signal of the frame #2 read out from the frame memory B (92), and the decoded image signal of the frame #output from the adder 90 is written in the frame memory A (91).

The image signal input in the period t6 is the same signal that has been input in the period t5. The similar operation to that in the period t3 is executed in the period t6 except replacing the memories A and B (91 and 92) with the other.

The image signal input in the period t7 is different from the signal which has been input in the period t7, and is intra-frame encoded. In the period t7, the image signal input to the terminal 84 is directly written in the frame memory B (92).

The operations described above are repeated for the duration of slow motion image production.

The above description is concerned with DVTR only, but it is possible to apply the idea described above to other apparatus even if it does not use a magnetic tape as a recording medium but an optical or a hard disc. The preceding description is for a half speed reproducing mode, but it is obvious to apply the concept to other modes in which the reproducing speed is slower than the normal reproducing mode. Further, the description is made as if the prohibition of the writing operation is decided for each frame of the image signal, but the prohibition of the writing operation can be decided for each block or each predetermined portion of the image.

As described above, the reproducing apparatus having a circuit shown in FIG. 6 and FIG. 7 can correctly decode and reproduce even if the image signal is encoded by the inter-frame encoding method or the method adaptively using the intra-frame and the inter-frame encoding method and the image signal is reproduced at slower speed than that in the normal reproducing mode.

Figure 10:
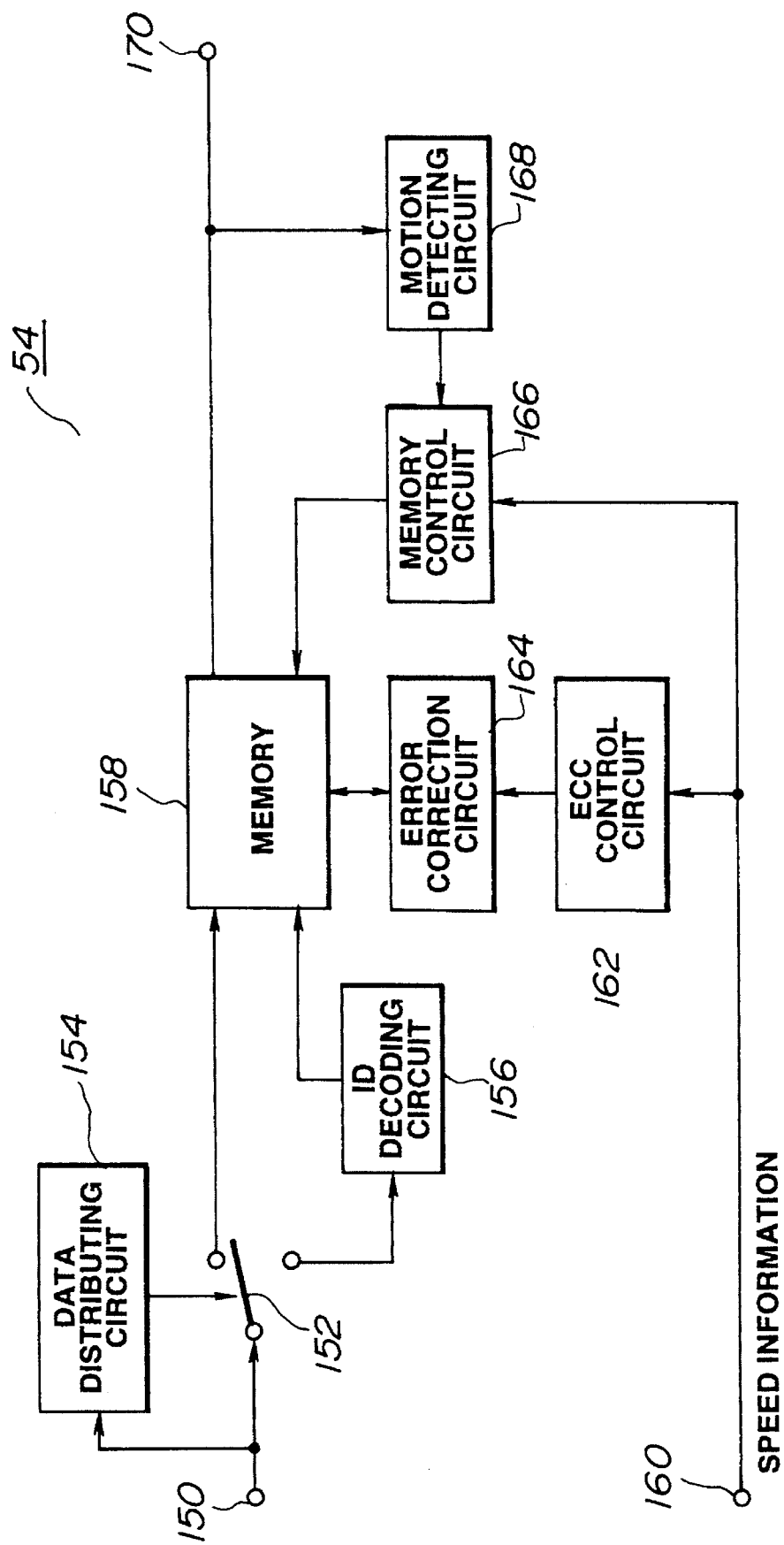
FIG. 10 is a block diagram which shows an example of a detailed circuit of another primary circuit in the reproducing system shown in FIG. 6.

FIG. 10 is a block diagram which shows an example of a concrete circuit of the transmitting decoding circuit 54 shown in FIG. 5.

The signal reproduced by the rotary head 52 is input to a terminal 150. A data distributing circuit 154 controls a switching circuit- 152 to separate the subordinate information codes from other codes on the basis of the synchronizing codes. An ID decoding circuit 156 decodes the subordinate information including the block number information and the frame number information. Such subordinate information is used for deciding the addresses where correspondent codes are written in a memory 158. Then, hereinafter, they are called as address information.

The ID decoding circuit. 156 produces writing addresses of the memory 158. The image data and the parity codes are written in the memory 158 according to the writing addresses. When the tape is transported at a speed slower than that in the normal reproducing mode, the same portion of the track may be traced a plurality of time and the writing address designated in different periods may be overlapped.

FIG. 11(a) shows a model of accessing address of the memory 158. In FIG. 11(a), solid lines 180 indicate the writing address of the memory 158 and dotted lines 182,183 indicate the reading address of the memory 158.

Figure 1:
FIG. 1 shows a model of a synchronizing block formed in a DVTR.

Speed information generated by a system controller not shown in figures is input to a terminal 160. An ECC control circuit 162 lets an error correction circuit 164 start to operate at a timing decided on the basis of the speed information. Error correction codes and error detection codes are formed by adding the parity codes to a data matrix involving a plurality of the synchronizing block as shown in FIG. 1. In short, the error correction and detection codes construct a product code formed by a data matrix. And the data matrix is supposed to include image information of one field.

Accordingly, error correction and error detection are executed for each field of the image signal, and accessing addresses are decided by addresses corresponding to the field of the image as a unit, as shown in FIG. 11(a). Hatched areas shown in FIG. 1(a) indicates timings and addresses at which the error correction circuit 164 accesses to the memory 158.

In FIG. 11, it is assumed that the image signal is reproduced at a quarter speed of that in the normal reproducing mode. A memory control circuit 166 controls writing and reading operations of the memory 158 on the basis of the speed information and a motion detection signal produced by a motion detecting circuit 168. The relation between the memory control circuit 166 and the motion detecting circuit 168 is described as follows.

The motion detecting circuit starts to operate at a timing, shown in FIG. 11(b), when a second field of a frame of the image signal stored in the memory 158 is processed by the error correction circuit 164, and detects whether or not the image involves a motion by comparing first fields of the image signals in adjacent frames. For example, the motion detecting circuit 168 computes a total of absolute values of differences between each pixels of the first field of the present frame and that of the previous frame. If the motion detecting circuit 168 judges that the image involves a motion, the circuit 168 turns its output signal into a high level as shown in FIG. 11(c). The output signal of the circuit 168 is supplied to the memory control circuit 166 as a motion detecting flag.

Figure 12:
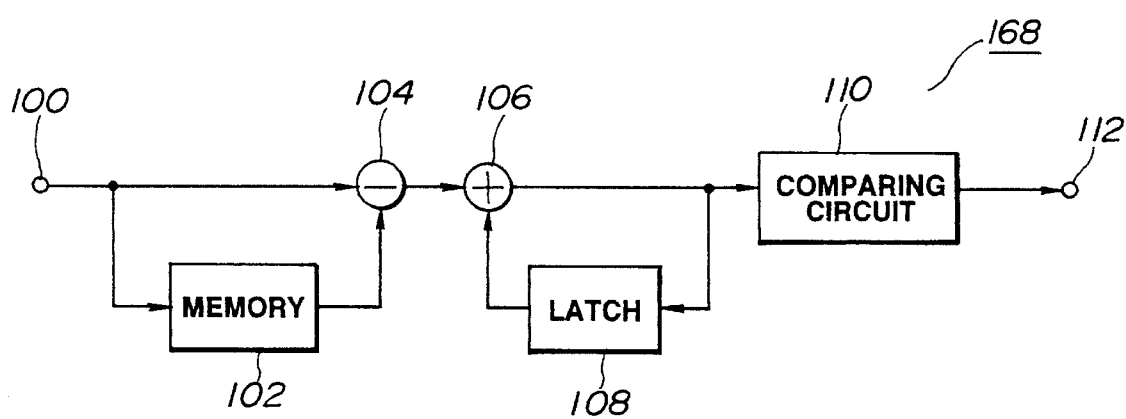
FIG. 12 is a block diagram which shows a motion detecting circuit shown in FIG. 10.

FIG. 12 is a block diagram which shows a concrete circuit of the motion detecting circuit 168. The image signal read out from the memory 158 is input to an input terminal 100, and is supplied to a memory 102. The memory 102 stores the image data of the first field of the previous frame. A subtracter 104 outputs absolute values of the difference between the image data of the first field of the present frame being input from the terminal 100 and that of the previous frame being output from the memory 102.

The absolute values of differences output from the subtracter 104 are accumulated by a well-known accumulator composed of an adder 106 and a latch circuit 108. In detail, the adder 106 adds the output value of the subtracter 104 to an accumulated value output from the latch circuit 108, and the output value of the adder 106 is stored in the latch as a new accumulated value.

A comparing circuit 110 compares the accumulated value which is produced by accumulating for a period of one field with a predetermined threshold value, and sets the motion detecting flag being a high level "1" at a timing shown in FIG. 11(c) if the accumulated value exceeds the threshold value. The circuit 110 sets the motion detecting flag being a low level "0" unless the accumulated value exceeds the threshold value. The motion detecting flag is supplied to the memory control circuit 166 via an output terminal 112.

Further, it is sufficient for the circuit shown in FIG. 10 to roughly detect a motion between two adjacent frames, and it is unnecessary to use all pixels of the first field for computing difference. Therefore, it is sufficient to compute difference values between curtailed pixels of first fields of adjacent frames. Accordingly, it is easy to decrease the capacity of the memory 102.

The memory control circuit 166 changes a method for addressing from a first method to produce reading addresses being continuous for each frame as shown by the dotted line 182 to a second method to produce reading addresses being continuous for each field as shown by the dotted line 183 and maintains the second method for a predetermined period of time, if the motion detecting flag turns the high level "1".

Accordingly, the image signal externally output from the output terminal 170 may repeatedly include the signal of the same field to prevent the vibration of the image if the image signal involves the motion. The two fields of the same frame of the image signal are always continuously output to improve the vertical resolving power if the image signal does not involve the motion.

The circuit shown in FIG. 10 uses the motion detecting method which computes differences between pixels of first fields of adjacent frames, but of course other motion detecting methods can be used.

As described above, the circuit shown in FIG. 10 creates the effects that the vibration of the image is prevented for a rapid motion image and the resolving power of the image is improved for other types of image.

Figure 13:
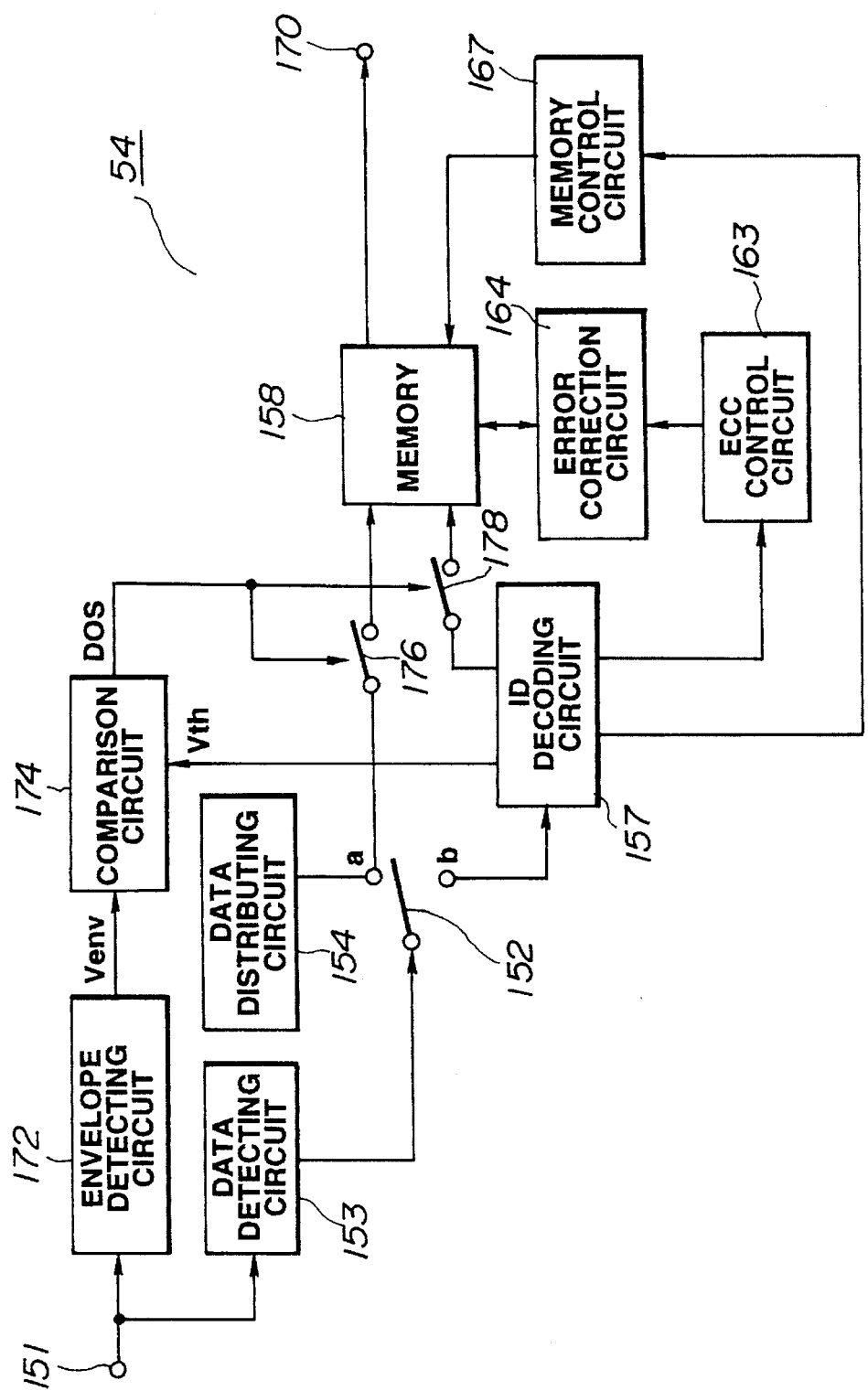
FIG. 13 is a block diagram which shows an example of a detailed circuit of the other primary circuit in the reproducing system shown in FIG. 6.

FIG. 13 is a block diagram which shows another example of an actual circuit of the transmitting decoding circuit 54 shown in FIG. 6. In FIG. 13, the same numbers are attached to the similar circuits to the circuits shown in FIG. 10.

The RF signal reproduced by the rotary head 52 is input to an input terminal 151 and supplied to a data detecting circuit 153. The data detecting circuit detects and reproduced recoded data and outputs a reproduced signal which is the same as the signal input to the terminal 150 shown in FIG. 10.

As described above, the switching circuit 152 separates the subordinate information codes from other codes under the control of the data distributing circuit 154. The subordinate information codes are supplied to an ID decoding circuit 157 via the terminal b of the switching circuit 152, and the other codes are supplied to the memory 158 via the terminal a of the switching circuit 152 and a switch 176.

An envelope detecting circuit 172 detects an envelope of the RF signal input to the terminal 151, and supplies a voltage signal having a voltage Venv according to an amplitude of the envelope to a comparison circuit 174. The comparison circuit 174 compares the voltage Venv with a threshold voltage Vth produced by the ID decoding circuit 157, and outputs a binary signal DOS. The binary signal DOS has a logic level "0" when the voltage Venv is higher than the voltage Vth, and has a logic level "1" in the other conditions.

The ID decoding circuit 157 generates write addresses where codes are written in the memory 158 on the basis of the address information, and supplies them to an address terminal of the memory 158 via a switch 178. The ID decoding circuit 157 also supplies a timing signal used for deciding a timing at which the error correction starts to an ECC control circuit 163 and a timing signal used for deciding a timing at which the reading operation starts from an initial read address to a memory control circuit 167. These timing signals are also generated on the basis of the address information.

Figure 3:
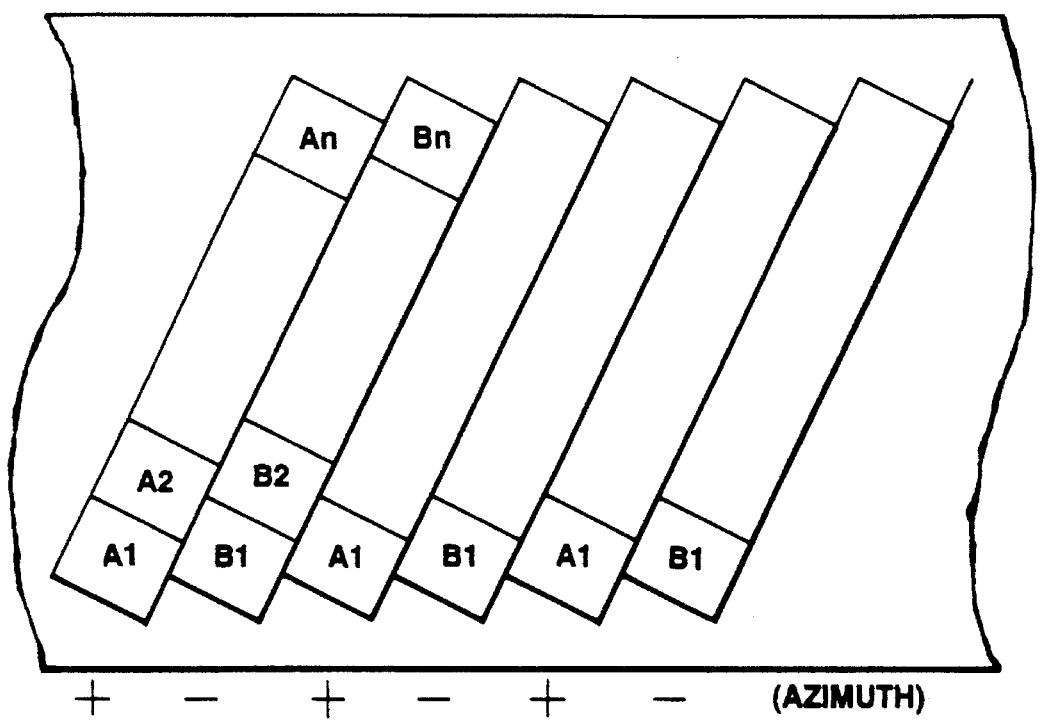
FIG. 3 shows an example of a recorded format formed on the magnetic tape by the DVTR.
Figure 4:
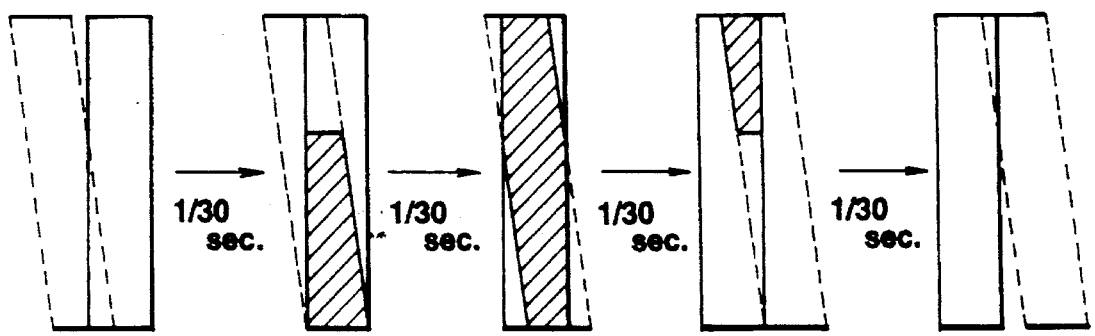
FIG. 4 shows tracing loci of a rotary head relative to the track in a slow motion reproducing mode.

For example, the threshold voltage Vth produced by the ID decoding circuit 157 is set a first voltage Vth1 corresponding to a voltage which the voltage Venv is in a condition that the head can reproduce the recorded signal from a half of a track after first detecting address information of a predetermined block, e.g. a block A1 shown in FIG. 3, of a new frame, and is set a second Vth2 corresponding to a voltage which the voltage Venv is in a condition that the head can reproduce the recorded signal from 75% of a track after first detecting address information of another predetermined block, e.g. a block B1 shown in FIG. 3 of the common frame.

The switches 176,178 are respectively connected to a code input terminal and the address terminal of the memory 158 and are controlled by the binary signal DOS. The switches 176,178 open when the binary signal DOS has the logic level "0". In short, a re-writing operation of the memory 158 is prohibited when the voltage Venv is less than the threshold voltage Vth.

The detailed description referring to FIG. 14 is as follows. In FIG. 14, (a) shows a waveform of the RF signal input to the terminal 151, (b) shows an envelop detect signal (the voltage signal) output from the envelope detecting circuit 172, and (c) shows the binary signal output from the comparison circuit 174.

At first the threshold voltage Vth output from the ID detecting circuit 157 is set the first threshold voltage Vth1. In a period T1, the voltage Venv of the envelope detect signal is lower than the voltage Vth1. Therefore, in the period T1, the binary signal DOS always has the logic level "1", the switches 176,178 always open, and the writing operation of the memory 158 is always prohibited.

At the beginning of a period T2 shown in FIG. 14, the amplitude of the reproduced signal increases and the voltage Venv exceeds the first threshold level Vth1. Accordingly, the binary signal DOS turns the logic level "0", the switches 176,178 are closed, and the writing operations of the memory starts. According to FIG. 14, the binary signal always has the logic level "0" in the period T2. The ID decoding circuit 157 always watches the position of the tape by referring the address information, and changes the threshold voltage Vth to the higher voltage Vth2 according to the position of the tape.

Accordingly, in the former period Tb of a period T3 shown in FIG. 14, the binary signal DOS has the logic level "1", and the writing operation of the memory 158 is prohibited. In a period Ta of the period T2 when the same codes can be reproduced as the period Tb, the amplitude of the reproduced signal is larger than that in the period Tb, and the rate of the error codes is less than that in the period Tb. Therefore, it is possible to prohibit the reproduced codes having less error codes reproduced in the period Ta being over-written by reproduced codes having more error codes reproduced in the period Tb.

In the rest of the period T3, the voltage Venv of the envelope of the RF signal exceeds the second threshold voltage Vth2, the writing operation of the memory 158 is executed according to the binary signal DOS having the logic level "0". In this period, the amplitude of the RF signal is higher than that in the rest of the period T2, and the rate of the error codes is relatively low. Therefore, it is advantageous that the codes stored in the memory 158 are rewritten in this period.

The ECC control circuit 163 starts the error correction circuit 164 error correcting on the basis of the timing signal supplied from the ID decoding circuit 157. The error correction circuit 164 corrects as many error codes as possible. The memory control circuit 167 starts the reading operation of the memory 158 from the initial address at a timing according to the timing signal supplied from the ID decoding circuit 157. The image codes read out from the memory 158 are output from the terminal 170 to backward circuits.

As described above, the circuit shown in FIG. 13 can prohibit the writing operation of the memory 158 when the reproduced codes having higher error rate than that of the stored codes in the memory 158. Therefore the circuit shown in FIG. 13 can output better reproduced information codes than the conventional circuit.

We claim:

1. An image signal reproducing apparatus comprising:
   reproducing means for reproducing an image signal and a subordinate signal from a recording medium, said reproducing means being capable of reproducing repeatedly the same portion of the image signal;
   memory means for temporarily storing the reproduced image signal; and
   control means for controlling the writing of the image signal into said memory means, said control means detecting whether or not a portion of the image signal being reproduced is the same as in said memory as stored according to the subordinate signal reproduced from the recording medium, and said control means prohibiting the over-writing of a portion of the image signal that said memory means has already stored according to the detection result.

2. An apparatus according to claim 1, wherein the recording medium is a tape, and said recording means is able to transport the recording medium at a speed lower than that at which the recording medium is transported in a recording mode to execute a slow motion reproduction.

3. An apparatus according to claim 1, wherein the image signal recorded on the recording medium includes compression encoded digital image data, and said reproducing means includes a decoding circuit for decoding the encoded digital image data, and said memory means storing digital image data decoded by the decoding circuit.

4. An apparatus according to claim 3, wherein the decoding circuit uses the digital image data read out from said memory means to decode the encoded digital image data.

5. An apparatus according to claim 3, wherein encoded digital image data are encoded by using an orthogonal transforming circuit.

6. An apparatus according to claim 3, wherein the encoded digital image data are encoded either by an intra-frame encoding method and/or an inter-frame encoding method, and the decoding circuit is capable of decoding both data encoded by the intra-frame encoding method and the inter-frame encoding method.

7. An apparatus according to claim 6, wherein the decoding circuit uses the digital image data read out from said memory means to decode the encoded digital image data encoded by the inter-frame encoding method.

8. An apparatus according to claim 6, wherein the inter-frame encoding method uses motion vectors which indicate motion of the image involved with the image signal, and said control means controls addresses to which the image signal is written.

9. An image signal reproducing apparatus comprising:
   reproducing means for reproducing an image signal from a recording medium, said reproducing means being capable of reproducing repeatedly the same portion of the image signal;
   memory means for temporarily storing the reproduced image signal; and
   control means for controlling a reading operation of said memory means, said control means repeatedly reading out the image signal from said memory means in predetermined unit portion, and said control means changing the predetermined unit portion according to a motion of the image signal.

10. An apparatus according to claim 9, wherein said control means sets the unit portion at one frame when the motion is relatively small, and sets the unit portion at one field when the motion is relatively large.

11. An apparatus according to claim 9, wherein said control means detects the motion of the image signal on the basis of the image signal read out from said memory means.

12. An apparatus according to claim 9, wherein said control means detects motion of the image signal at intervals being proportional to the reproducing speed of the image signal.

13. An apparatus according to claim 9, wherein the recording medium is a tape, and said reproducing means is able to transport the recording medium at a speed lower than that at which the recording medium is transported in a recording mode to execute a slow motion reproduction.

14. An apparatus according to claim 9, wherein the image signal recorded on the recording medium includes compression encoded digital image data, and said memory means stores the encoded digital image data.

15. An apparatus according to claim 14, wherein the encoded digital image data are encoded by using an orthogonal transforming circuit.

16. An image signal reproducing apparatus comprising:

reproducing means for reproducing an image signal from a recording medium, said reproducing means being capable of reproducing the same portion of the image signal repeatedly;

memory means for temporarily storing the reproduced image signal; and control means for controlling a writing operation of said memory means, said control means being able to change a condition to allow the image signal to be written in said memory means, wherein said control means controls whether the image signal is written on the basis of the amplitude of the image signal.

17. An apparatus according to claim 16, wherein the condition is more strict when the portion of the image signal which said memory means as stored is to be written than when a portion of the image signal is to be written for the first time.

18. An apparatus according to claim 16, wherein said control means allows the image signal to be written when the level of an envelope of the image signal is higher than a threshold level which is set at a first level when a portion of the image signal is to be written for the first time and is set at a second level being higher than the first level when the portion of the image signal in the same as a portion already stored in said memory means as stored is to be written.

19. An apparatus according to claim 16, wherein the recording medium is a tape, and said reproducing means is able to transport the recording medium at a speed lower than that at which the recording medium is transported in a recording mode to execute a slow motion reproduction.

20. An apparatus according to claim 16, wherein the image signal recorded on the recording medium includes compression encoded digital image data, and said memory means stores the encoded digital image data.

21. An apparatus according to claim 20, wherein the encoded digital image data are encoded by using an orthogonal transforming circuit.

22. An image reproducing apparatus, comprising:

reproducing means for reproducing image data from a recording medium, said reproducing means reproducing the same portion of the image data repeatedly;

storing means for storing the reproduced image data;

control means for controlling a writing operation of said storing means, said control means changing a condition which is used to determine whether the image data is allowed to be written in said storing means.

23. An apparatus according to claim 22, wherein the condition is more strict when the portion of the image signal which said memory means as stored is to be written than when a portion of the image signal is to be written for the first time.

24. An apparatus according to claim 22, wherein the recording medium is a tape, and said reproducing means is able to transport the recording medium at a speed lower than that at which the recording medium is transported in a recording mode to execute a slow motion reproduction.

25. An apparatus according to claim 22, wherein the image signal recorded on the recording medium includes compression encoded digital image data, and said memory means stores the encoded digital image data.

26. An apparatus according to claim 25, wherein the encoded digital image data are encoded by using an orthogonal transforming circuit.

27. An image reproducing apparatus, comprising:

reproducing means for reproducing coded image data composed of intra-frame image data coded by intra-frame coding and inter-frame image data coded by inter-frame coding from a recording medium, said reproducing means repeatedly reproducing the same portion of the coded image data;

decoding means for decoding the coded image data reproduced by said reproducing means;

storing means for storing image data decoded by said decoding means, said decoding means decoding the coded image data by using the image data stored in said storing means;

detecting means for detecting that said storing means has stored one frame portion of the image data; and control means for controlling a writing operation of said storing means, said control means inhibiting writing of the image signal of said frame according to a detecting result of said detecting means.

\* \* \* \* \*

UNITED STATES PATENT AND TRADEMARK OFFICE
CERTIFICATE OF CORRECTION

PATENT NO. : 5,561,529
DATED : October 1, 1996
INVENTOR(S) : YASUYUKI TANAKA ET AL.

Page 1 of 3

It is certified that error appears in the above-identified patent and that said Letters Patent is hereby corrected as shown below:

AT [57] ABSTRACT

Line 4, "sad" should read -- the--.
Line 6, "prove" should read --provide--.
Line 15, "to become" should read --from becoming--.

COLUMN 1

Line 23, "One" should read --one--.
Line 37, "block" should read --blocks--.
Line 44, "head 1A,1B" should read --heads 1A,1B--.
Line 54, "Signal" should read --signal--.

COLUMN 2

Line 26, "Cusine" should read --Cosine--.
Line 58, "occurred" should read --occurring--.

COLUMN 3

Line 53, "FIG. 11(a)-1(c)" should read
--FIG. 11(a)-11(c)--.

COLUMN 4

Line 9, "detecting" should read --detected--.
Line 11, "terminal" should read --terminal a--.

UNITED STATES PATENT AND TRADEMARK OFFICE
CERTIFICATE OF CORRECTION

PATENT NO. : 5,561,529
DATED : October 1, 1996
INVENTOR(S) : YASUYUKI TANAKA ET AL.

It is certified that error appears in the above-identified patent and that said Letters Patent is hereby corrected as shown below:

COLUMN 5

Line 35, "capstan 50" should read --capstan 51--.

COLUMN 6

Line 4, "receives" should read --receive--.
    Line 13, "to be written" should read --for writing--.

COLUMN 7

Line 4, "B" should read --B(92)--.
    Line 17, "t" should read --to--.
    Line 37, "(91).for" should read --(91) for--.
    Line 50, "frame #output" should read --frame #3 output--.
    Line 57, "period t7," should read --period t6,--.

COLUMN 8

Line 20, "circuit- 152" should read --circuit 152--.
    Line 29, "circuit. 156" should read --circuit 156--.
    Line 34, "time" should read --times--.
    Line 46, "block" should read --blocks--.
    Line 54, "FIG. 1(a) indicates" should read --FIG. 11(a) indicate--.

UNITED STATES PATENT AND TRADEMARK OFFICE
CERTIFICATE OF CORRECTION

PATENT NO.  : 5,561,529
DATED       : October 1, 1996
INVENTOR(S) : YASUYUKI TANAKA ET AL.

It is certified that error appears in the above-identified patent and that said Letters Patent is hereby corrected as shown below:

COLUMN 10

Line 8, "duced" should read --duces--.
Line 60, "envelop" should read --envelope--.

COLUMN 13

Line 16, "as" should read --has--.
Line 25, "in" should read --is--.

COLUMN 14

Line 7, "as" should read --has--.

Signed and Sealed this

Nineteenth Day of August, 1997

Attest:

BRUCE LEHMAN

*Attesting Officer*      *Commissioner of Patents and Trademarks*